Figure 1:
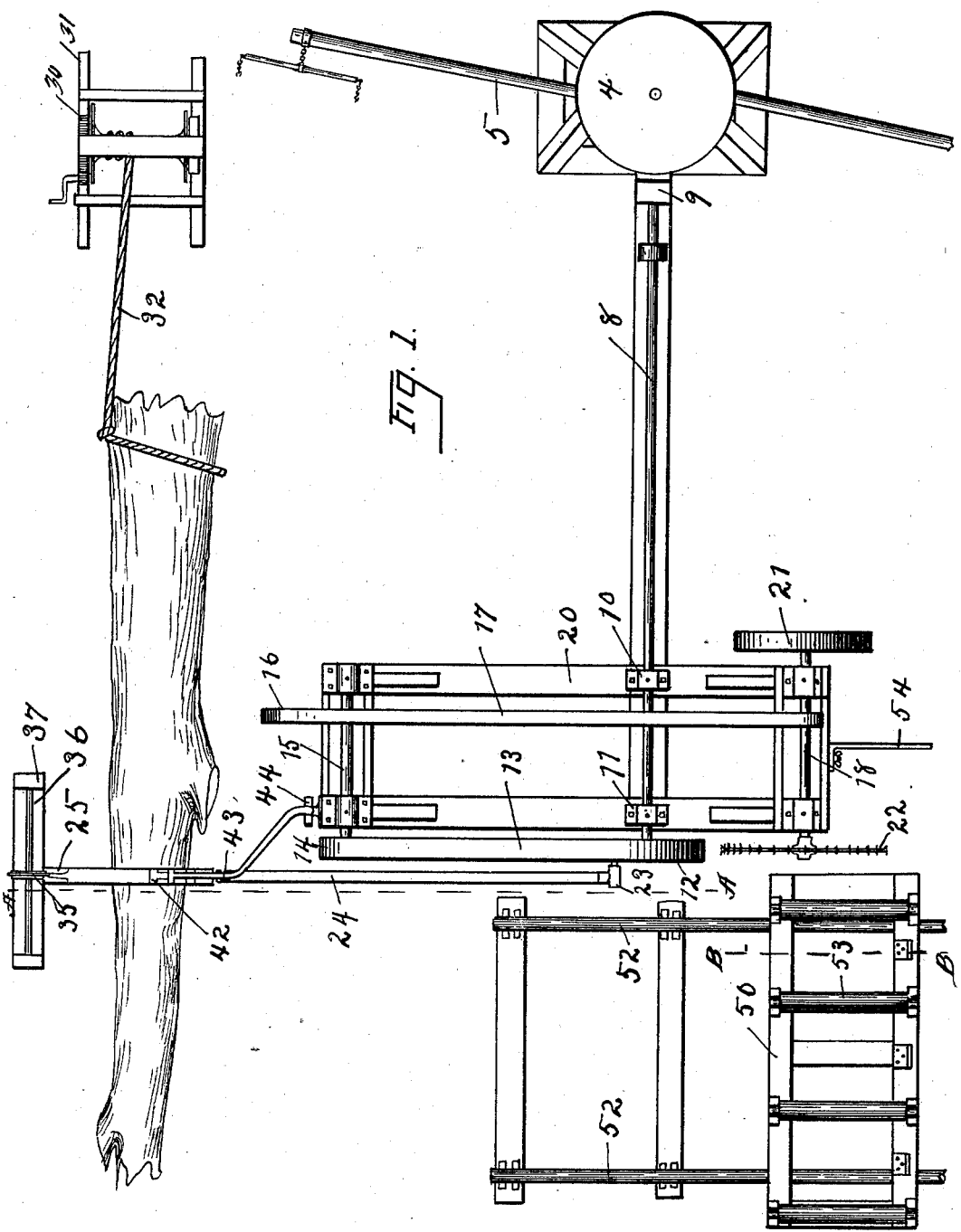

No. 669,956. Patented Mar. 12, 1901.
C. C. HENRY.
COMBINATION CROSSCUT AND CIRCULAR SAW.
(Application filed Nov. 12, 1900.)
(No Model.) 2 Sheets—Sheet 1.

WITNESSES: INVENTOR.
Charles C. Henry
BY
Francis M. Wright
ATTORNEY.

No. 669,956. Patented Mar. 12, 1901.
C. C. HENRY.
COMBINATION CROSSCUT AND CIRCULAR SAW.
(Application filed Nov. 12, 1900.)
(No Model.) 2 Sheets—Sheet 2.
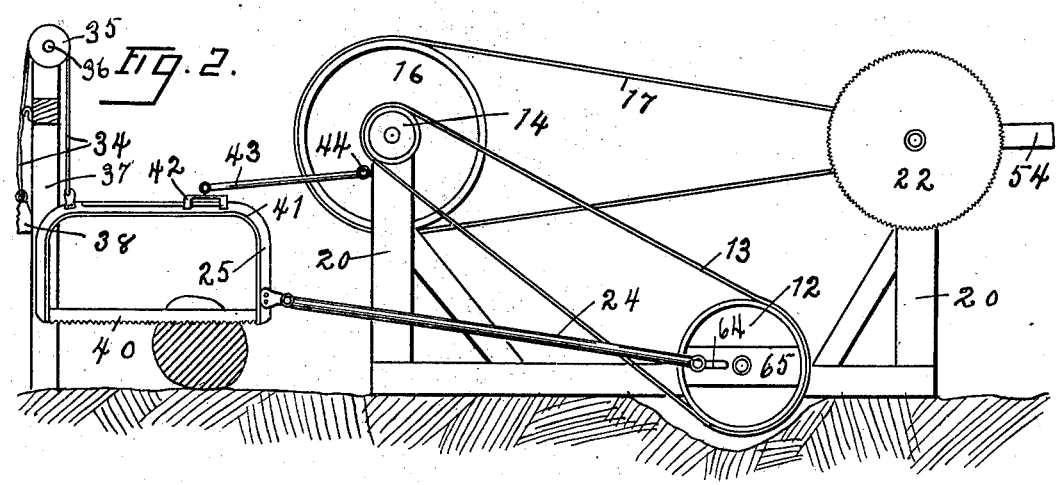
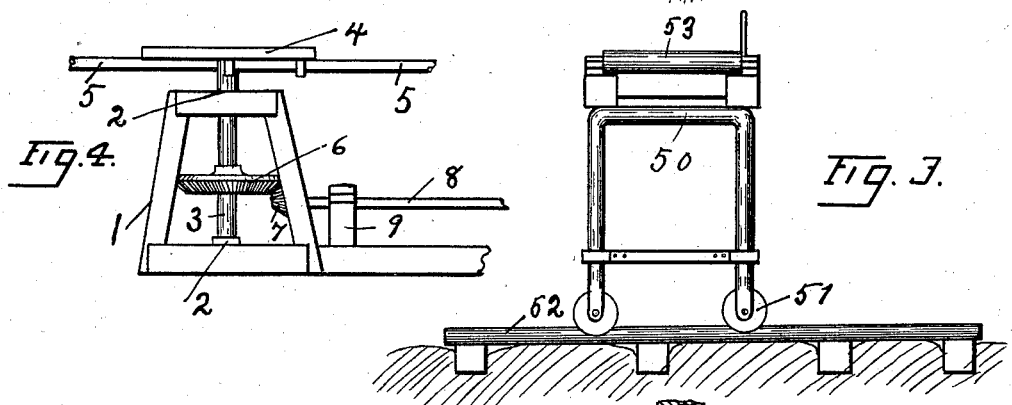
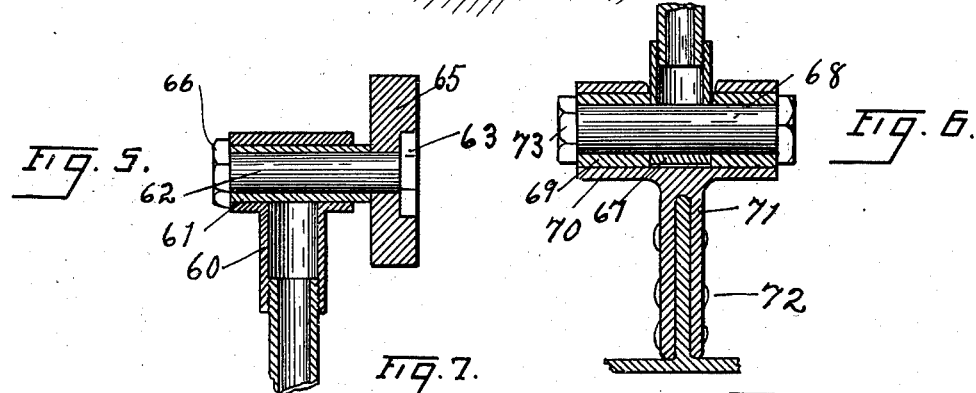
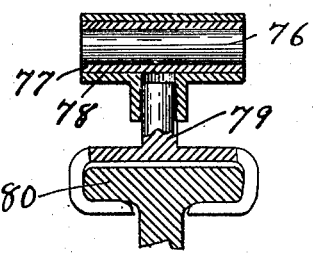
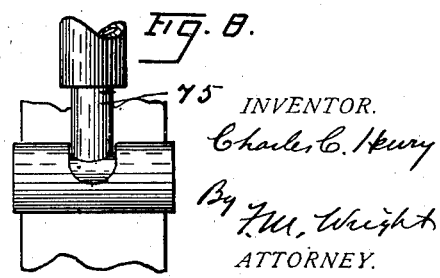
WITNESSES:
INVENTOR.
Charles C. Henry
By F. M. Wright
ATTORNEY.

UNITED STATES PATENT OFFICE.

CHARLES C. HENRY, OF SAN FRANCISCO, CALIFORNIA, ASSIGNOR OF ONE-HALF TO JOHN A. McMILLEN, OF SAME PLACE.

COMBINATION CROSSCUT AND CIRCULAR SAW.

SPECIFICATION forming part of Letters Patent No. 669,956, dated March 12, 1901.

Application filed November 12, 1900. Serial No. 36,288. (No model.)

*To all whom it may concern:*

Be it known that I, CHARLES C. HENRY, a citizen of the United States, residing at San Francisco, in the county of San Francisco and State of California, have invented certain new and useful Improvements in Combination Crosscut and Circular Saws, of which the following is a specification.

My invention relates to an improved apparatus whereby the trunks and limbs of trees can be cut up with rapidity and economy into short lengths for stove-wood.

The object of my invention is to provide an apparatus which can be operated by horse-power near the place where the tree is cut down and which shall comprise a circular saw for cutting up the limbs of trees and the smaller end of the trunk of the tree into short lengths for stove-wood, and also a crosscut-saw for cutting the thicker end of the trunk into such short pieces, both of said saws being driven from the same source of power, means for moving the trunk into proper positions to be cut up by the crosscut-saw, and a carrier for moving the lighter pieces of the tree up to the circular saw to be cut up thereby.

My invention therefore resides in the novel construction, combination, and arrangement of parts for the above ends, hereinafter fully specified and particularly pointed out in the claim.

In the accompanying drawings, Figure 1 is a plan view of the apparatus. Fig. 2 is a vertical transverse section thereof on the line A A of Fig. 1. Fig. 3 is a transverse section on the line B B of Fig. 1. Fig. 4 is a side elevation of the driving mechanism operated by the horse-power. Figs. 5 and 6 are details of the connection of the pitman for operating the crosscut-saw from a wrist upon a driving-pulley, and Figs. 7 and 8 are details of the guide for holding the saw vertical.

Referring to the drawings, 1 represents a frame suitably secured to the ground and carrying bearings 2 for a vertical shaft 3. On the upper end of said shaft 3 is mounted a disk 4, to which are attached beams or poles 5, to which horses may be harnessed for the purpose of rotating the shaft 3 by horse-power. Said shaft 3 carries a bevel-gear 6, meshing with a bevel-pinion 7 upon a longitudinal shaft 8, mounted in bearings 9 10 11, the other end of said shaft carrying a pulley 12, connected by means of a belt 13 with a pulley 14 on a shaft 15, the other end of said latter shaft carrying a pulley 16, driving, by means of a belt 17, a shaft 18. The shafts 15 and 18 are mounted in bearings on a framework 20, fixedly secured upon the ground. The shaft 18 carries at one end a fly-wheel 21 and at the other end a circular saw 22. The pulley 12 carries a wrist-pin 23, connected by a pitman 24 with a crosscut-saw 25.

Said crosscut-saw is used for cutting the trunk of the tree into short lengths whenever the thickness of the trunk is too great to permit it being cut up by the circular saw, and the latter is used for thinner parts of the trunk or limbs. In order to move the trunk in the direction of its length, so as to cut it up into the desired lengths, there is provided a windlass 30 on a frame 31, spiked or secured to the ground, around which windlass is wound a rope 32. The rope 32 is secured to the end of the trunk, and the trunk is moved along the ground beneath the crosscut-saw by means of said windlass the required short distance, and then the crosscut-saw is lowered into contact with the trunk and commences cutting the trunk. When said trunk has been cut through, the severed part thereof is rolled out of place, the crosscut-saw is raised out of contact with the trunk, and the trunk is moved forward by means of the windlass. To raise said saw, there is provided a rope 34, passing over a pulley 35 on a shaft 36 on posts 37. To the other end of said rope may be attached a weight 38 to reduce the weight of the crosscut-saw resting on the trunk.

Said crosscut-saw is made somewhat in the form of an ordinary hack-saw, but of much greater size. It comprises the saw-blade 40 and a back 41, said back being formed of a T shape in cross-section. The upper edge, however, of said back is enlarged to form a rib to be engaged by a guide 42 on the end of an arm 43, pivotally extending from the standard 44 of the frame 20, which carries the shaft 15. Said guide 42 serves to keep said saw upright, so that the blade thereof saws a straight cut through the trunk.

When said crosscut-saw has been raised in the manner described, the rope 32 is now tied around the end of the trunk from which the short length has just been cut off and said trunk moved longitudinally along the ground by means of said windlass.

To bring the thinner pieces of the tree up to the circular saw, there is provided a carrier 50, which runs, by means of wheels 51, upon rails 52 and carries rollers 53. A stop 54 on the frame 20 is provided, against which the end of the length of the trunk or of the limb of the tree can be moved in order to gage the length to be cut by the circular saw. When the piece of the tree has been moved upon the rollers 53 up to said stop, the carrier 50 is then moved upon its wheels 51 against the circular saw, cutting off the desired length. The carrier is then moved back, and the piece of the trunk or limb is again moved forward upon the rollers 53 until its end comes into contact with the stop 54, and another short length is then cut off by the circular saw in the same manner.

In order to provide a construction which is at the same time strong and cheap, I make the pitman 24 of gas-pipe. Said pitman is screwed at its power end into a T-piece 60, surrounding a bushing 61 on a bolt 62, the head 63 of which is movable in a slot 64 in a bearing or plate 65, secured to the pulley 12. A nut 66 secures said T-piece and bushing in place. The other end of the pitman 24 is screwed into a short T-piece or eye 67 around a bolt 68, said bolt being surrounded by a bushing 69. Upon said bushing works the cylindrical portion 70 of the T piece, the upright 71 of which is forked and embraces the rib of the back of the crosscut-saw, being riveted thereto, as shown at 72. A nut 73 maintains the parts in place.

The arm 43, which carries the guide for the crosscut-saw, is screwed to a screw 75, projecting from a short shaft 76, upon which is a bushing 77 and a T-piece 78, and in the upright of which T-piece 78 is screwed an extension 79 from the guide 42, which engages the rib 80 of the back of the saw.

I claim—

In an apparatus of the character described the combination of a frame, a shaft in said frame, means for rotating said shaft, a circular saw mounted in said frame, operatively connected with said shaft to be driven thereby, a pulley on said shaft, a slotted plate secured to the pulley, a bolt having its head adjustably secured in said slot, a tubular pitman connected at its power end with a T-piece surrounding said bolt, said T-piece, a drag-saw, a T-piece the upright of which is forked and embraces the rib of the back of the saw, a bolt in the cylindical head of the latter T-piece, a short T piece or eye also surrounding said bolt, the working end of the pitman being screwed into said eye, a guide in which the back of the saw slides, and a swinging arm pivotally connected to said guide, substantially as described.

In witness whereof I have hereunto set my hand in the presence of two subscribing witnesses.

CHAS. C. HENRY.

Witnesses:
 FRANCIS M. WRIGHT,
 J. A. MCMILLEN.